Nov. 1, 1932.  J. WESTBURG  1,885,788
CAN HOLDER
Filed Sept. 29, 1931   2 Sheets-Sheet 1

Inventor
Joel Westburg
By Clarence A. O'Brien
Attorney

Nov. 1, 1932.  J. WESTBURG  1,885,788
CAN HOLDER
Filed Sept. 29, 1931    2 Sheets-Sheet 2

Inventor
Joel Westburg
By Clarence A. O'Brien
Attorney

Patented Nov. 1, 1932

1,885,788

UNITED STATES PATENT OFFICE

JOEL WESTBURG, OF ONAMIA, MINNESOTA

CAN HOLDER

Application filed September 29, 1931. Serial No. 565,906.

This invention relates to a structure which may be conveniently referred to as a can holder, and it has more specific reference to a device adapted for use in a cooling tank for maintaining a milk or cream can anchored in a submerged condition in water contained in said tank.

Persons acquainted with the dairy farming industry know that it is customary to submerge milk and cream cans, either filled or partly filled, in cold water in a container generally referred to in the trade as a cooling tank.

Difficulty is encountered however, in pouring milk into a partially filled can due to the bobbing and floating action of the can when its contents is insufficient to weight the can down and maintain it in a perpendicular position. Moreover, as the closure is generally fitted snugly in the filler neck, it is not uncommon to upset the can when extracting the closure for placing additional milk in the can while it is partly submerged and wobbling in the water of the cooling tank.

The purpose of the present invention is to provide a simple and economical device which is permanently arranged in the tank to function as a holder to maintain the can in a substantially rigid position so that the top can be removed and replaced or additional milk poured into the can without objectionable bobbing and movement of the can in the water.

Figure 1:
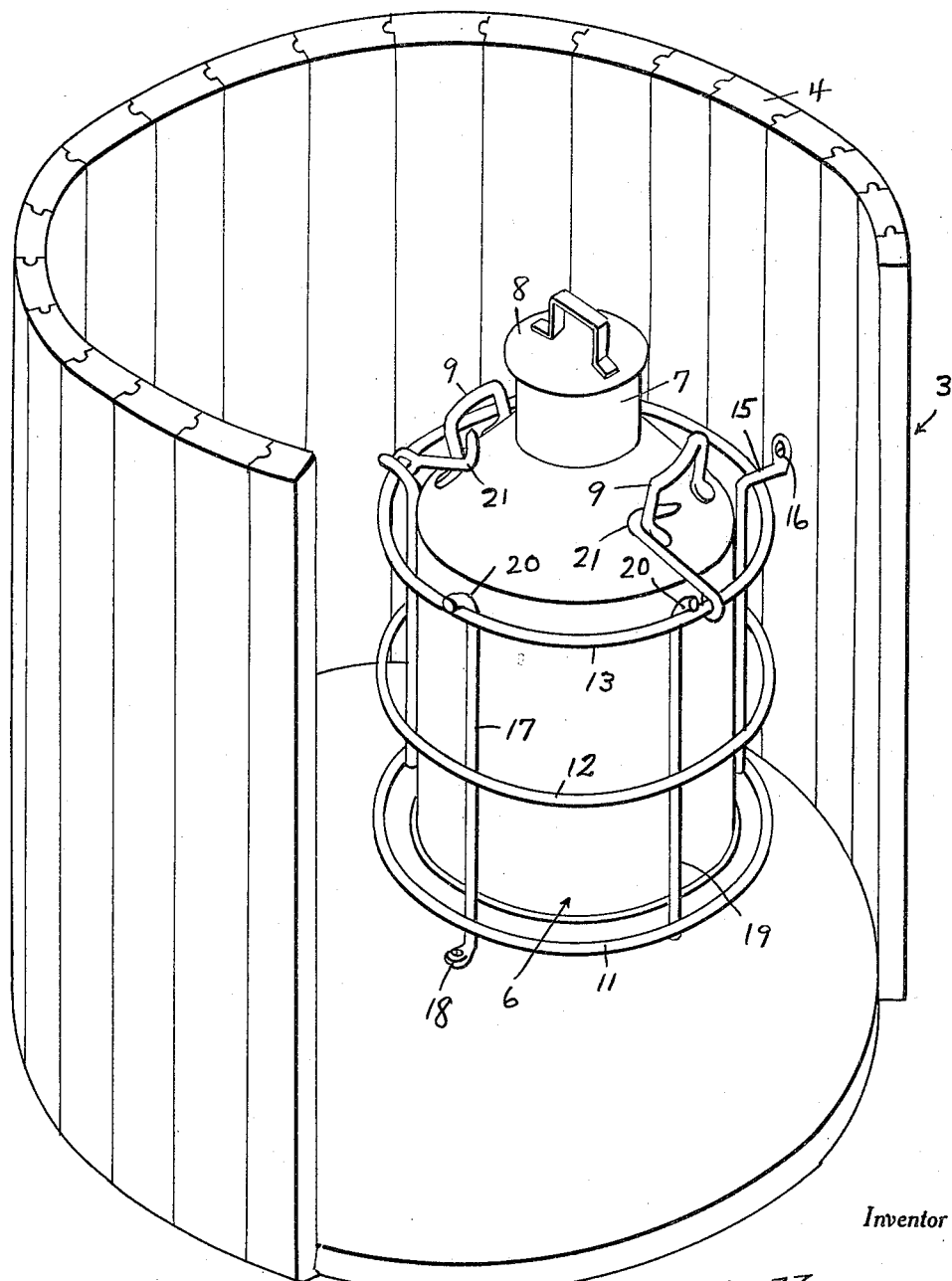
Figure 1 is a perspective view showing a portion of a cooling tank, an ordinary milk can, and a special holder provided for maintaining the can in cooling position.
Figure 2:
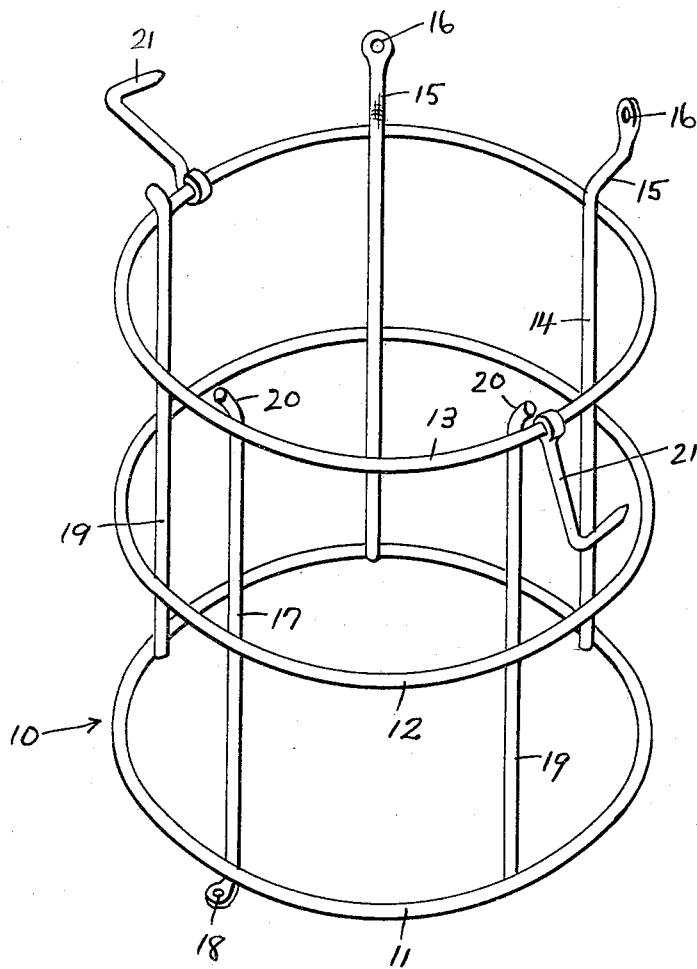
Figure 2 is a perspective view of the holder per se.

In Figure 1, the numeral 3 designates the tank which comprises the usual annular upstanding wall 4, and circular base 5. In practice, this tank is partly filled with cold water and under ordinary conditions the milk can 6 is lowered into the cold water. The can is provided with the customary filler neck 7 and the removable closing lid or cover 8 as well as suitable handgrips 9. All of these features are conventional.

The improved holder is generally designated by the numeral 10 and is of multiple element open cage construction. It is composed of three wire rings 11, 12 and 13 disposed in vertically spaced superposed relationship and serving to connect together a plurality of vertical rods. I have shown five of these rods and they are distinguished by different numerals to facilitate interpretation.

There is one pair of rods, the rods of this pair being designated by the numeral 14. These are for attaching purposes and have their upper ends laterally offset as at 15, flattened and apertured as at 16 to permit fastening by screw, nail or the like, to the wall 4 of the tank as seen in Figure 1.

The rod 17 is provided at its lower end with an out-turned flattened apertured attaching ear 18 nailed or screwed to the bottom of the tank. The two remaining rods 19 are primarily for can embracing and ring reinforcing purposes. The upper ends of the rods 17 and 19 are flared outwardly as indicated at 20 to facilitate insertion and removal of the can to avoid catching or tripping of the can.

The numerals 21 designate swingably mounted hooks carried by the uppermost ring 13 and engageable with the handgrips 9 as seen in Figure 1 to securely anchor the can in the cage or holder. The gist of the invention is in the provision of an open work cage-like holder for reception of a conventional cream can, said holder being anchored in the tank at a suitable place, and provided with retaining elements, preferably swingably mounted hooks to engage handles or grips on the can whereby to hold the can firmly down in the water to facilitate pouring of an additional supply of milk therein.

This is advantageous in that if the can is only partly filled it would, without a holder, be too light to remain submerged. Consequently, it would generally be necessary to extract the can bodily from the water for additional filling purposes. This promotes a waste of time. By anchoring the can temporarily in the cage and merging it in the water, constant and more effective cooling is provided.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. A milk can holder for use in a cooling tank, said holder comprising a plurality of vertically spaced rings, and circumferentially spaced vertically disposed rods fastened to said rings in spaced assembled relationship, certain of said rods having their upper ends bent outwardly to facilitate placement of the can in the holder.

2. A milk can holder for use in a cooling tank, said holder comprising a plurality of vertically spaced rings, and circumferentially spaced vertically disposed connecting rods fastening said rings together in assembled relationship, certain of said rods having their upper ends bent outwardly to facilitate placement of the can in the holder, additional ones of said rods having their upper ends bent laterally outward beyond the adjacent ring and then laterally upward and flattened and apertured to provide an attaching ear, the remaining rod having its lower end bent and flattened and disposed laterally outward to provide an additional attaching ear.

3. A milk can holder for use in a cooling tank, said holder comprising a plurality of vertically spaced rings, and circumferentially spaced vertically disposed connecting rods fastening said rings together in assembled relationship, certain of said rods having their upper ends bent outwardly to facilitate placement of the can in the holder, additional ones of said rods having their upper ends bent laterally outward beyond the adjacent ring and then laterally upward and flattened and apertured to provide an attaching ear, the remaining rod having its lower end bent and flattened and disposed laterally outward to provide an additional attaching ear, together with a pair of diametrically opposite hooks swingably mounted on the uppermost ring and adapted for releasable engagement with handgrips on the milk can.

In testimony whereof I affix my signature.

JOEL WESTBURG.